March 12, 1968

M. MONTAGNA 3,372,653

ELECTRIC CURRENT TRANSMISSION DEVICE, PARTICULARLY
FOR ENTERTAINMENT ELECTRIC VEHICLES

Filed April 22, 1966

INVENTOR
Marino Montagna
BY
Agent

March 12, 1968

M. MONTAGNA 3,372,653

ELECTRIC CURRENT TRANSMISSION DEVICE, PARTICULARLY
FOR ENTERTAINMENT ELECTRIC VEHICLES

Filed April 22, 1966

Marino Montagna
INVENTOR

BY

Agent

United States Patent Office 3,372,653
Patented Mar. 12, 1968

3,372,653
ELECTRIC CURRENT TRANSMISSION DEVICE, PARTICULARLY FOR ENTERTAINMENT ELECTRIC VEHICLES
Marino Montagna, Via Ludovico Pavoni 23, Brescia, Italy
Filed Apr. 22, 1966, Ser. No. 544,604
Claims priority, application Italy, Apr. 26, 1965, 9,406/65, Patent 761,383
11 Claims. (Cl. 104—148)

The present invention relates to an electric current transmission device to electric vehicles, particularly useful for toys or entertainments.

It is the main object of the present invention to provide an electric current transmission device of reliable operation and practical use.

A further object of the present invention is that said device transmits electric current from a support plane of a moving vehicle whatever may be the position of the vehicle thereon.

These and other objects, that will be more apparent hereinafter, are attained by an electric current transmission device for electric vehicles, comprising in combination a plurality of strips consisting of an electrically conducting material and connected to an electric current source, the strips being arranged juxtaposed to one another, mutually insulated and defining the vehicle runway, there being successively provided between a number of these strips respective grooves running parallel to the strips, and a contact device including a frame secured beneath the vehicle and swingable within a plane vertical to the runway plane and rotatable about a vertical axis with respect to the runway plane, said frame having an elongated extension carrying at the extremities thereof, rolling members and a plurality of contact elements, said contact elements being arranged near the rolling members and adapted to come into contact with the strips when the corresponding rolling member is in one of said grooves.

Provided on the frame are stop means, which alternatively hold a corresponding rolling member in one of said grooves. The arrangement is such that normally one rolling member always remains in a corresponding groove until the other rolling member enters the next groove and is held therein by the said stop means. The rolling member, which remained behind, will then be drawn out of the groove by the moving vehicle.

Further features and advantages will be more apparent from the following detailed description of a preferred but not limiting embodiment of the device according to the invention, with reference to the accompanying drawings, in which.

Figures 4, 5:
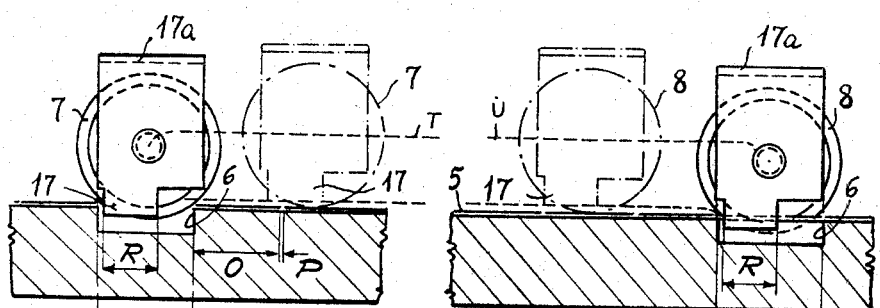
FIG. 4 is a side view of the device in FIG. 1 at two different positions on the supporting plane.
FIG. 5 is a side view, similar to FIG. 4, of the device in FIG. 1.
Figure 3:
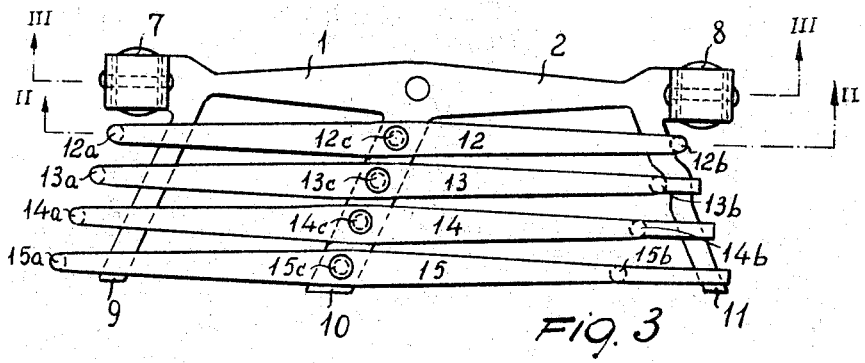
FIG. 3 is a top plan view of the device in FIG. 1.
Figure 6:
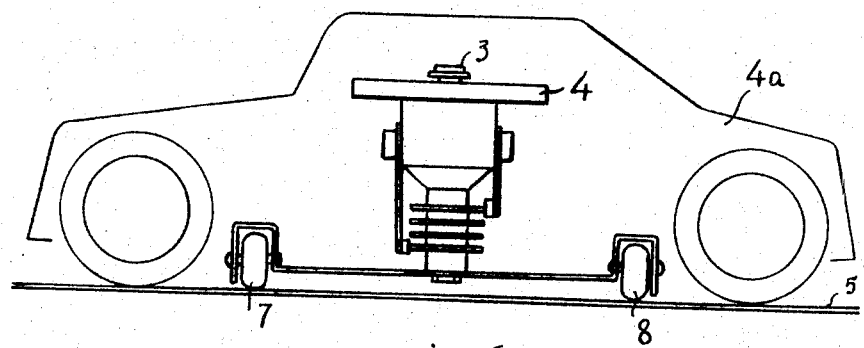
FIG. 6 is a diagrammatically plan view of the device according to the invention, located in a vehicle in a not working position therewith.
Figure 7:
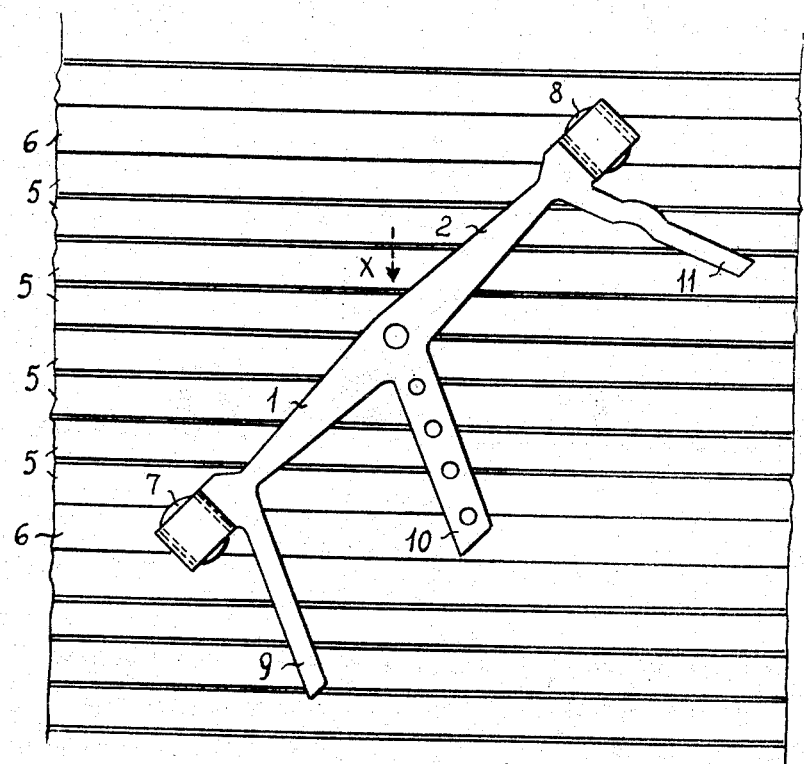
FIG. 7 is a plan view of the supporting plane and diagrammatically shows a position of the device according to the invention.

The arms 1 and 2, which can oscillate upwardly and downwardly are secured to a pin 3, freely rotating on a supporting element 4, which is rigidly connected to the vehicle 4a (see FIG. 6). The vehicle 4a moves on a supporting plane consisting of a plurality of conducting sheets or strips 5 arranged parallel to one another and spaced therebetween. Grooves 6 are provided successively between a number of strips (FIGS. 5 and 7). At the end of the arms 1 and 2 there are idly mounted rollers 7 and 8 having a partially spherical surface, and diameter greater than the width of said grooves 6. Arms 1 and 2 have also overhanging portions 9, 10 and 11, which project therefrom in a spaced relation and extend at the same level over said conducting strips 5. The portion 10 receives a number of spaced resilient strips 12, 13, 14, 15 (FIG. 3) extending on said portions 9 and 11 and carrying at their ends contacts 12a, 13a, 14a, 15a and 12b, 13b, 14b, 15b, respectively.

In order to understand the operation of the device according to the invention, let us start from the case in which the arms 1 and 2 are in the position where the rollers 7 and 8, having the same diameter, are both in a groove 6. The arms 1 and 2, hold then the portions 9 and 11 in a lowered position, as shown on the left side of FIG. 2 thus define a gap 16 with the resilient strips 12–15.

Figure 1:
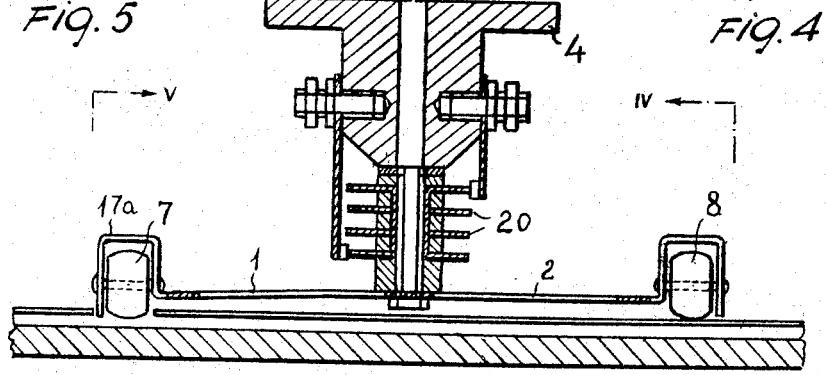
FIG. 1 is a cross-sectional view of the device according to the invention.
Figure 2:
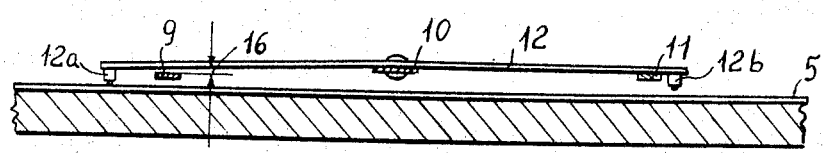
FIG. 2 is a fragmentary vertical sectional view of the device in FIG. 1.

It should be noted that in FIGS. 1 and 2 the roller 8 and relative portion 11 are shown in a raised position, by way of illustration, i.e. in relation to a different position from that shown in plan view (FIG. 3) for illustration purpose.

Contacts 12b–15b can therefore contact the strips 6 due to the gap 16 and the resiliency of strips 12–15.

Assume now that the vehicle is moving in the X direction. Accordingly, both the rollers will be urged to move in the same direction (FIG. 7).

With reference to FIGS. 4 and 5; the motion direction for roller 8 appears as directed to the left and the motion for roller 7 as directed to the right.

The roller 7 is free to follow the vehicle 4a until it falls into a successive groove 6 in a offset position thereto.

Due to configuration of appendix 17 of the supporting bracket 17a of width R smaller than that of groove 6 motion of roller 8 will be prevented. Roller 8, instead, which in the meanwhile has taken a transverse position with respect to the groove 6 and has slidably moved along the same for a short length will release the appendix 18 from the edge of groove and will mount on the sheets 5. It will run according a curve path, as roller 7, causing at the same time the latter to slide apart along the groove 6 in order to keep the vehicle in its movement direction. It occurs therefore that while the roller 7 moves on the surface, out of the grooves, the contacts 12b–15b are in contact with the relative sheets 5, since the roller 8 is in the groove 6, the portion 11 being thus in a lowered position and clearance 16 occurring between the arm 2 and resilient strips 12–15. Roller 7 instead raises the arm 1 and portion 9, which lifts in turn the resilient strips at the contacts 12a–15a. These contacts, throughout the travel period of the roll 7, cannot contact the sheets 5. Upon engagement of the roller 7 with a groove 6 the contacts 12a–15a can rest again onto the strips 5, which are connected to an electric current source (not shown).

As the vehicle proceeds in its movement in the X direction, roller 7 cannot further proceed in the same direction, since said movement is prevented by the appendix 17. The roll 7 in fact meets the groove 6 with its axis forming an angle therewith. The appendix 17 therefore comes into abutting engagement with the groove edge thus preventing the roll 7 from stopping up the latter.

On the contrary, roller 8 will be free to advance.

As stated above, roller 7 will remain engaged within the groove, and in turn roller 8 will go through a curve path, until both the rollers are aligned in the same groove, and so on. What has been stated for X direction is obviously valid also for any direction, as can be noted from the movement possibilities of the appendixes 17 and 18. It can be appreciated that whichever may be the vehicle direction, the movements of the oscillating arms are always the same, and that the vehicle can also freely rotate about itself. Therefore, it can be stated that the rollers 7 and 8, with the respective appendixes of the supporting brackets thereof, will cause contacts 12a–15a to alternatively contact, by means of the resilient strips 12–15, secured to the portion 10 by rivets or screws 12c–15c, the series of sheets 5, so as to have a continuous supply of electric current. In fact, each series of contacts 12a–15a, 12b–15b will remain engaged until the next series has been energized.

In the case theretofore dealt with (see FIG. 7), there have been shown on the plane by way of example eight sheets between each pair of grooves 6 and the device has been provided with four resilient strips having eight contacts. However, arms 1 and 2 can have a greater number of resilient strips symmetrically arranged on both sides of the pivot pin 3.

The number of resilient strips and contacts can be changed depending upon the number of the conducting strips provided between two successive grooves 6.

It will depend on the number of vehicles to be operated and in the manner they are intended to be operated. According to requirements, the surface sheets can also be of a different width to one another.

In order to convey the transmitted power to the motor of the vehicle known contact discs 20 are provided (four in the case illustrated). Wires from fasteners 12c–15c are welded to the respective discs through suitable holes. In case of need, suitable insulations will be interposed.

The arms 1 and 2 may also be carried out with hinges adjacent the pin 2 and be operated by suitable springs. Obviously, the device may be provided with a resilient means for absorbing the shocks of the appendixes and rollers against the groove edges.

According to an important modification of the invention, half of the resilient contact-holder sheets will be arranged on one side of the arms 1 and 2, and half on the other side of said arms in order to balance the thrust onto said resilient arms.

The invention may be changed and modified without departing from scope of the inventive concept as defined by the following claims.

I claim:

1. Electric current transmission device for electric vehicles, comprising in combination a plurality of strips consisting of an electrically conducting material and connected to an electric current source, the strips being arranged juxtaposed to one another, mutually insulated and defining the vehicle runway, there being successively provided between a number of these strips respective grooves running parallel to the strips, and a contact device including a frame secured beneath the vehicle and swingable within a plane vertical to the runway plane and rotatable about a vertical axis with respect to the runway plane, said frame having an elongated extension carrying at the extremities thereof rolling members and a plurality of contact elements, said contact elements being arranged near the rolling members and adapted to come into contact with the strips when the corresponding rolling member is in one of said grooves.

2. A device according to claim 1, further comprising a stop means secured on said frame near said rollers to temporarily hold the corresponding rolling member into the corresponding groove.

3. A device according to claim 1, characterized in that the contact means has a supporting member connected to the vehicle, an essentially rod-like element rotatably mounted within said supporting member with an end facing the runway plane, an arm which lies transversely with respect to said rod-like element and which is connected therewith at said end thereof and swingable in an essentially vertical plane, substantially spherical rolling members, means for removably engaging said arm within the grooves of the runway surface, and a plurality of electric contact elements on said arm and lying at a distance from one another, equal to that of said strips.

4. A device according to claim 1, wherein said plurality of strips defining said runway surface are divided in zones of light parallel and spaced electrically conducting material strips, cooperating with the vehicle.

5. A device according to claim 3, wherein said supporting member connected to the vehicle is provided with a flange co-operating with said rod-like element rotatably mounted therein.

6. A device according to claim 3, characterized in that said arm transversely arranged with respect to said rod-like element, is rigidly connected thereto, and consists of resilient material allowing it to oscillate in a substantially vertical plane.

7. A device according to claim 3, characterized in that said arm arranged transverse to said rod-like element is pivoted thereto to oscillate in a substantially vertical plane, and is provided with known resilient means for pressing said arm against the runway surface.

8. A device according to claim 3, characterized in that said arm arranged transverse to said rod-like element has at the ends thereof two bracket members for supporting two substantially spherical rollers.

9. A device according to claim 3, characterized in that said bracket members have on the outer side at the lower edge thereof an appendix downwardly directed, the width of which is less than that of the outer side of said bracket and less than the width of said lengths having reduced surfaces with respect to the plane defined by said parallel strips forming said bearing surface.

10. A device according to claim 9, characterized in that said arm arranged transverse to said rod-like element has offset portions at the ends thereof, which are arranged in a substantially horizontal plane, rigidly connected to said arm, and associated at the top with said plurality of electric contact elements spaced between one another.

11. A device according to claim 10, characterized in that the arm arranged transverse to said rod-like element has at each end offset portions lying in a substantially horizontal plane, two on each side, at the top said appendixes being associated with a plurality of said contact elements spaced from one another.

References Cited

UNITED STATES PATENTS

| | | | |
|---|---|---|---|
| 2,768,697 | 10/1956 | Shotwell. | |
| 2,850,987 | 9/1958 | Epergue | 104—149 |
| 3,205,618 | 9/1965 | Heytow | 104—149 XR |

FOREIGN PATENTS

| | | |
|---|---|---|
| 502,869 | 3/1939 | Great Britain. |
| 803,756 | 4/1951 | Germany. |
| 928,484 | 6/1947 | France. |
| 968,836 | 4/1958 | Germany. |

ARTHUR L. LA POINT, *Primary Examiner.*

S. T. KRAWCEWICZ, *Assistant Examiner.*